United States Patent
Daqoune et al.

(10) Patent No.: US 11,879,437 B2
(45) Date of Patent: Jan. 23, 2024

(54) METHOD FOR CONTROLLING HEATING OF ROTOR BLADES OF A WIND TURBINE

(71) Applicant: Wobben Properties GmbH, Aurich (DE)

(72) Inventors: Tarik Daqoune, Montreal (CA); Mouhcine Akki, Beloeil (CA); Aubai Al Khatib, Aurich (DE); Elsy Arratia-Scheit, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/060,942

(22) Filed: Dec. 1, 2022

(65) Prior Publication Data

US 2023/0167807 A1 Jun. 1, 2023

(30) Foreign Application Priority Data

Dec. 1, 2021 (EP) .................................. 21211710

(51) Int. Cl.
*F03D 80/40* (2016.01)
*F03D 7/04* (2006.01)

(52) U.S. Cl.
CPC ............ *F03D 80/40* (2016.05); *F03D 7/042* (2013.01); *F05B 2260/20* (2013.01); *F05B 2260/80* (2013.01); *F05B 2270/32* (2013.01); *F05B 2270/323* (2013.01); *F05B 2270/324* (2013.01); *F05B 2270/325* (2013.01); *F05B 2270/327* (2013.01); *F05B 2270/332* (2013.01)

(58) Field of Classification Search
CPC ...... F03D 7/042; F03D 80/40; F05B 2260/80; F05B 2260/82; F05B 2260/821; F05B 2260/8211; F05B 2270/323; F05B 2270/324; F05B 2270/325; F05B 2270/328; F05B 2270/332
See application file for complete search history.

(56) References Cited

U.S. PATENT DOCUMENTS

| | | | |
|---|---|---|---|
| 6,890,152 B1 | 5/2005 | Thisted | |
| 7,857,586 B2 | 12/2010 | Wobben | |
| 9,518,561 B2 | 12/2016 | De Boer et al. | |
| 9,759,193 B2 * | 9/2017 | Jepsen | F03D 7/0264 |
| 10,330,083 B2 * | 6/2019 | Hilling | F03D 80/40 |
| 10,487,801 B2 * | 11/2019 | Beekmann | F03D 7/026 |
| 2015/0023792 A1 | 1/2015 | Spitzner et al. | |
| 2017/0058871 A1 | 3/2017 | Movsichoff et al. | |
| 2019/0003463 A1 * | 1/2019 | Buggy | F03D 80/40 |

FOREIGN PATENT DOCUMENTS

| | | |
|---|---|---|
| CN | 109322802 B | 4/2020 |
| EP | 3165766 A1 | 5/2017 |

* cited by examiner

*Primary Examiner* — Courtney D Heinle
*Assistant Examiner* — Danielle M. Christensen
(74) *Attorney, Agent, or Firm* — Seed IP Law Group LLP (57) ABSTRACT

A method for controlling heating of rotor blades of an aerodynamic rotor of a wind turbine, wherein, the heating of the rotor blades is initiated, if icing of the rotor blades is expected, wherein according to an icing criteria, if icing is expected is evaluated depending on a determined ambient temperature, a determined relative humidity, and a determined wind speed, each defining a determined weather parameter, and further according to the icing criteria, if icing is expected is evaluated depending on a temporal change of at least one of these weather parameters and/or of at least one other weather parameter.

18 Claims, 4 Drawing Sheets

METHOD FOR CONTROLLING HEATING OF ROTOR BLADES OF A WIND TURBINE

BACKGROUND

Technical Field

The present invention relates to a method for controlling heating of rotor blades of an aerodynamic rotor of at least one wind turbine. The present invention is also directed to a corresponding wind turbine in which such method is implemented, and it is directed to a wind farm comprising a plurality of such wind turbines.

Description of the Related Art

It is known that cold weather conditions can lead to icing of rotor blades of a wind turbine and thus to ice formation on the rotor blades. Such ice formation or ice accumulation is undesirable as it endangers people if the ice falls off the rotor blades. Furthermore, ice formation on the rotor blade of a wind turbine leads to a change in aerodynamic behavior, so that the wind turbine can no longer be operated optimally and the generated power is reduced, or it cannot operated at all. Icing on rotor blades might also lead to a significant unbalancing of the rotor. Accordingly, if icing is detected, the operation of the wind turbine is usually stopped.

It is also difficult to detect icing and different methods are known to detect ice formation. One is described in the U.S. Pat. No. 7,857,586 B2. However, it is desirable not just to detect the icing, but also to remove it by heating. An improved method for detecting and removing icing is disclosed in U.S. Pat. No. 9,518,561 B2.

The disadvantage of known methods for initiating heating of rotor blades when ice formation is detected, is that already a large amount of ice may have been formed before ice formation could be detected. Thus, the wind turbine is already not working optimally, when the heating is initiated.

Additionally, it will take time before the rotor blades are heated sufficiently to remove the ice. During this time, the wind turbine is still working in an undesirable state. It might also be more difficult to remove ice once it has already formed an ice layer with significant thickness.

CN 109322802 B describes a method for predicting blade icing of wind turbines depending on the distance of current environmental data to a constructed hyperplane.

However, such method seems quite theoretical and does not seem to adequately take the necessary individual circumstances into account.

BRIEF SUMMARY

Provided are techniques for a removal of ice formation or techniques to avoid icing at all, and/or to provide or improve a method for predicting icing on rotor blades. At least the invention seeks to propose an alternative solution.

Provided is a method directed to controlling heating of rotor blades of an aerodynamic rotor of at least one wind turbine. The aerodynamic rotor is equipped with rotor blades, in particular with three rotor blades. Accordingly a common wind turbine is controlled with this method.

The heating of the rotor blades is controlled in such a way, that heating is initiated, if icing of the rotor blades is expected. Thus, heating is initiated in advance of the expected icing. This allows for preventive heating. It is not necessary to wait until icing occurs and the formed ice will have a negative effect. Instead, the rotor blades are heated to keep the rotor blades warm and prevent the ice formation.

It is further suggested that to determine if icing is expected, the icing criteria is evaluated depending on a determined ambient temperature, a determined relative humidity, and a determined wind speed. Accordingly, an icing criteria is defined and used to evaluate whether icing is expected. For the evaluation, weather parameters are determined, namely at least the ambient temperature, the relative humidity, and the wind speed. All these parameters are determined for an actual or predicted situation. Depending on their values, icing is expected or not. The icing criteria is the rule for deciding whether icing is expected or not, depending on these values. Thus, the icing criteria may be named as an icing detection criteria.

In particular, such an icing criteria could define a range of weather parameters for which it is known that icing will occur. As more than one weather parameter is taken into account, an area of weather parameters can be defined. In particular the range or area could be obtained from historical observations. To fulfil the icing criteria, actual weather parameters are determined that fall inside the range or area of these weather parameters.

The weather parameters may include information about a current weather situation and/or information about a future weather situation. Such future weather situation can be determined by applying an estimation.

It was found that primarily the ambient temperature, relative humidity, and wind speed are weather parameters that influence the formation of ice and are thus good indicators for icing. If these parameters are observed and evaluated properly, icing can thus be identified, in particular predicted without additional sensors. This way, expensive sensors and problems of the malfunctioning of such sensors can be avoided.

The ambient temperature can also synonymously be nominated as outside temperature. It represents the temperature of the environment outside of the wind turbine. Namely, the temperature of the air surrounding the wind turbine, in particular surrounding a nacelle and or the rotor blades of the wind turbine. The ambient temperature can be measured at a surface of the wind turbine, in particular at a surface of the nacelle, including a hub of the rotor, and/or at a surface of at least one rotor blade.

The relative humidity represents the relative humidity of the ambient air surrounding the outside of the wind turbine. In particular, surrounding the nacelle and/or the rotor blades of the wind turbine. It can be measured at the nacelle, in particular by a sensor placed on top of the nacelle.

The wind speed represents the wind speed of the wind acting on the wind turbine or approaching it. The wind speed can be measured, using a sensor, such as an anemometer, or a LIDAR. It can also be estimated using a rotational speed of the rotor and a power generated by the generator of the wind turbine at that particular rotor speed.

Depending at least on these three weather parameters it is evaluated according to the icing criteria whether icing of the rotor blades is expected or not. A determined weather situation will not necessarily cause icing to occur immediately. The ice formation may also take some time before becoming significant. But it was realized that the beginning of icing can be predicted using said weather parameters. It was realized that icing only takes place at particular ranges of temperature and particular ranges of relative humidity. The ranges also depend on the wind speed. It was realized that the same values for ambient temperature and relative humidity may or may not lead to icing, depending on the wind speed.

It is further suggested that to determine if icing is expected, the icing criteria is evaluated depending on a temporal change of at least one of these weather parameters or of at least one other weather parameter.

Accordingly, the method further provides for determining a temporal change of at least one weather parameter of the ambient temperature, the relative humidity, and the wind speed. Alternatively, or additional, it is also possible to determine a temporal change of other weather parameters, for example the temporal change of an air pressure. The result may also be that no temporal change took place. Considering such temporal change of at least one weather parameter may also be part of the icing criteria.

It was found that such temporal change of a weather parameter may indicate a weather change and can thus also indicate a change of the weather situation towards an icing situation. It was further found that best results can be achieved by analyzing such temporal change in combination with absolute values of the other weather parameters mentioned.

In addition it was noticed, that even when the determined weather parameters seem to indicate that icing is expected, icing may not be expected and/or heating may not be necessary, when the temporal change suggests a trend towards a weather condition for which icing is not expected. Therefore the icing criteria is extended such that it also considers the temporal change of the weather parameters. Vice versa, it was also noticed that heating may be necessary, if absolute values of the weather parameters seem to indicate no icing but when the temporal change indicates a trend towards an icing situation.

A temporal change of a weather parameter that, in combination with the absolute values of the weather parameters, indicates an icing may be an increase, a decrease or even a temporal stability. If that indicates an icing depends on the particular situation, i.e., it depends on all considered parameters, including the temporal change.

According to another aspect for the icing criteria an icing area, defining an area in which icing is expected, is determined with respect to a parameter space spanned at least by the ambient temperature and by the relative humidity, whereby the icing area is determined depending on the wind speed.

Accordingly, a parameter space is spanned at least by the temperature and relative humidity, i.e., such parameter space is thus defined by all possible pairs of values of temperature and relative humidity.

The wind speed is also a criteria, but it is suggest to consider the wind speed such that different icing areas are defined depending on the wind speed. This way a plurality of icing areas may occur, each for a different wind speed. Accordingly, a determined ambient temperature and determined relative humidity, that lie inside the icing area for a determined wind speed of 15 m/s (meters/second) may not lie inside the icing area for a determined wind speed of 5 m/s to give a simple example.

Based on the icing area defined that way, to determine if icing of the rotor blades is expected, the icing criteria is evaluated depending on determining if the determined ambient temperature and the determined relative humidity define a weather point inside the icing area.

However, the determined ambient temperature and relative humidity define a point in such parameter space and such point may be denominated as weather point, or alternatively and synonymously as determined point. To give one example, such weather point in the parameter space may be given by an ambient temperature of −3° C. and a relative humidity of 80%, if these value are determined. Such parameter space is just two dimensional, but it may have a higher order if further weather parameters in addition to ambient temperature and relative humidity are considered.

The icing area is thus one possibility for defining part of said icing criteria. If a set of weather parameters, i.e., the weather point, lies within this icing area, icing may be expected to occur, but the result may further depend on the temporal change of the at least one weather parameter. Such temporal change of the at least one weather parameter may indicated that in spite of the weather point being inside the icing area, icing may not be expected, e.g., if the temporal change indicates that the weather point appears to leave the icing area. However, simply speaking, the icing area is an area in the parameter space associated with expected icing.

The icing area may also cover several unconnected patches or regions of the parameter space. It may also surround zones of none-icing areas, i.e., areas in the parameter space, in which no icing is expected. In other words, the icing area may include voids, that do not belong to the icing area but which are completely surrounded by the icing area.

According to another aspect, it is suggested that wind speed ranges are predefined, and to determine if icing is expected, the icing criteria is evaluated depending on the wind speed with respect to the predefined wind speed ranges and in particular the icing area is determined depending on the wind speed ranges.

Accordingly, the icing criteria comprises considering predefined wind speed ranges. The wind speed is thus considered by determining in which wind speed range the determined wind speed lies.

In particular, the icing area is defined depending on these predefined wind speed ranges, e.g., three wind speed ranges may be defined: a small, medium, and large wind speed range. For evaluating if icing is expected, it is just checked if the wind speed is in the small, medium, or large wind speed range. If expected icing is evaluated based on icing, only three areas need to be defined for this example, i.e., one for small, medium, and large wind speeds.

It was realized that for similar wind speeds the icing criteria and thus the icing area remains fairly similar and will not change significantly. Therefore, the icing criteria can be defined separately for each predefined wind speed range.

In particular, the icing area can be defined separately for each predefined wind speed range. This way it is possible to define just a few icing areas. Small changes in the wind speed do not, or seldom result in a change of the considered icing area.

It was thus also realized that the detection of expected icing and also the subsequent heating takes a lot of time and within such time the wind speed might change, as the wind usually changes constantly. Accordingly to have a stable basis for defining the icing areas wind speed ranges are considered rather than actual fluctuating wind speed. This enables for a good stable identification of the icing area.

According to one aspect, a first wind speed range is predefined for wind speeds up to a cut-in wind speed, a second wind speed range is predefined for a partial-load operation, i.e., for a wind speeds from the cut-in wind speed up to a nominal wind speed. A third wind speed range is predefined for full-load operation, i.e., for wind speeds from the nominal wind speed up to an initial storm wind speed.

And finally a forth wind speed range is predefined for storm operation, i.e., for wind speeds above the initial storm wind speed.

Subdividing the wind speed in such wind speed areas has the advantage that the wind turbine also might choose different operating modes depending on these four wind speed ranges. Accordingly, that facilitates to distinguish between these wind speed ranges. In addition corresponding operating modes may also influence the formation of icing. In particular it was found that the actual wind speed acting on the rotor blades depends on the rotational speed of the rotor and thus it depends on the operating mode. This relationship can be considered by using such wind speed ranges.

It was also realized that with more accurate ice detection methods the expected icing is known more accurately and the wind speed has a bigger impact on the icing area or the method may better distinguish between different icing areas depending on the wind speed ranges. Accordingly, the wind speed ranges may be defined in smaller steps.

According to another aspect, the temporal change of at least one weather parameter is a temporal change of at least the ambient temperature, the relative humidity, the wind speed and an air pressure.

It was found that these four parameters may each give a good additional indication of icing or no icing depending on their change or no change. It was found that a drop in temperature might indicate an increased probability of icing, whereas an increase in temperature might indicate the opposite.

With increasing relative humidity air might tend to emit water. Depending on further weather conditions that might lead to icing.

It was also found that not only the absolute wind speed but also a change in the wind speed influences the likelihood of icing.

A change of the air pressure might indicate a change of the weather situation and might thus also indicate an increase or decrease of the likelihood of icing.

All these values can be measured by a corresponding sensor, often placed on the top of the nacelle. The explanation below is also applicable to all of these weather parameters, e.g., the air pressure may be a measurable pressure in the air surrounding the wind turbine, in particular the nacelle of the wind turbine. Additionally or alternatively, the air pressure is determined for the entire wind park. Accordingly the air pressure may be measured in the proximity of the wind turbine, using a sensor of the wind turbine, or it may just be measured at one location in the wind park, e.g., by using a measuring mast.

According to another aspect, to determine if icing is expected, the icing criteria is evaluated further depending on at least one supplemental information. It was realized that the evaluation of expected icing may depend on additional information and considering such additional information as supplemental information makes it possible to more accurately determine expected icing. In distinguishing from the weather parameters, the supplemental information do not necessarily confine to weather related information. Instead, it is possible to even consider parameters that can be influenced or set to a desired value, such as operating parameters.

Accordingly, the icing criteria comprises considering the at least one supplemental information. This could mean that when a weather point is identified that lies within the icing area, the supplemental information could suggest that icing is not expected nonetheless. This is for example, if a blade is already heated to a warmer temperature limiting the ice formation. In the same it is also possible that the supplemental information suggests that icing is expected even if a weather point is positioned outside of the icing area. For example, this scenario occurs, when loads on the blades suggest that ice formation has already commenced.

Alternatively or additionally, an, or the, icing area, is determined depending on the at least one supplemental information. In a similar way to how the icing area is adapted depending on the wind speed, the supplemental information can be considered for determining the icing area. For example, the supplemental information may extend the parameter space to a higher order parameter space. The icing area is then a higher order area inside said parameter space, wherein the icing area is depending on the weather parameters and the supplemental information. It is also possible to predefine ranges for the at least one supplemental information. The icing area is then defined depending on these predefined supplemental parameter ranges.

The at least one supplemental information is of the list comprising a blade temperature, the air pressure, a blade load, a dew point of an ambient air, a rotational speed, and a tip-speed ratio.

The blade temperature is representative of a temperature on at least a part of the surface of a rotor blade. The icing area may better be determined when also considering the blade temperature.

For example, when the rotor blade is already warm, the icing area may be smaller or shifted towards a colder ambient temperature than for a cold rotor blade. In other words, there is no icing expected and thus no need for heating, when the rotor blade is already warm enough to prevent icing.

It was found that the air pressure also has an impact on icing and accordingly it is suggested to take the air pressure into account as supplemental information. According to one aspect the icing area may be changed depending on the air pressure. In particular, an icing boarder may be changed or shifted depending on the air pressure.

The blade load is representative of a load acting on at least one of the rotor blades. It was found that such load may also have an impact on icing. Such load indicates the aerodynamic situation at the rotor blades and that may influence the accretion of ice. In addition, with higher loads on the blades the stress on the blades also increases and accordingly it is more important to heat the blades early enough to avoid icing on the blades.

The dew point affects the icing area as it indicates when the air is saturated with water. The closer the actual weather situation, i.e., air temperature, humidity and air pressure, is to the dew point, the more likely that icing will occur. That can be reflected in the icing area of the parameter space. Therefore the dew point may be considered as a supplemental information.

The rotational speed of the rotor may also have an impact on the icing area. It was noticed that apparent wind is depending on the rotational speed. In other words, there is an additional wind speed component to the determined wind speed due to the rotation of the rotor. Consequently, the apparent wind, thus the wind speed that seems to be acting on the rotor blades, is different from the determined wind speed. Usually the apparent wind speed is higher than the determined wind speed when the rotor is rotating. It was noticed that the change in apparent wind speed also has an effect on the expected icing. Therefore, the icing area is determined also depending on the rotational speed.

The icing area can also be determined depending on the tip-speed ratio. The tip-speed ratio is the relation of the rotational speed to the wind speed. Since both have an effect on expected icing, it is also possible to consider the tip-speed ratio. To determine if icing is expected, the icing criteria is also evaluated depending on the tip speed ratio. It was found that icing is less likely if the tip speed ratio is small, in particular with same wind speed.

According to another aspect, at least one of the determined weather parameters, and, if applicable, the at least one determined supplemental information contain actual values. Actual values represent values that are currently detectable, in particular for a current weather situation. It is suggested that actual values are determined by measuring the corresponding weather parameter or, if supplemental information is considered, by measuring the supplemental information for example by using a suitable sensor. Actual values of the supplemental information can also be determined by their set values.

Alternatively or additionally, at least one of the determined weather parameters, and if applicable, at least one of the determined supplemental information contain estimated values. For example, the rotational speed of the aerodynamic rotor of the wind turbine is linked to the wind speed. It is therefore possible to determine, e.g., the wind speed by estimation via the rotational speed when further considering states of the wind turbine, such as the output power and/or the blade angles. A state observer may also be used.

Alternatively or additionally, at least one of the determined weather parameters, and if applicable, at least one of the determined supplemental information contain predicted values. In particular a weather forecast may be used. Instead or in combination the change over time of the measured or estimated parameters may be used to predict future values of theses parameters, in particular to predict the weather point in the future. A similar approach is suggested for the wind speed and the supplemental information.

Accordingly, at least one actual value is measured using a suitable sensor. The sensor may be installed either on the wind turbine or on a met mast of the wind farm.

For example, the ambient temperature can be determined using a temperature sensor, the relative humidity may be determined using a hygrometer, and the wind speed may be determined using an anemometer and/or a LIDAR.

Alternatively or additionally, at least one estimated value is determined from an operating parameter of an operating point of the wind turbine. Such operating parameters could be rotational speed or power. For example, the wind speed may be determined from the rotational speed using a known correlation.

Alternatively or additionally, at least one predicted value is determined using a time derivative of values, in particular of preceding values of the corresponding weather parameter or of supplemental information. Accordingly, a series of weather parameters may be stored for a predefined period of time, preferably at predefined time steps. For this series of weather values a derivative with respect to time is obtained, showing the change of the weather parameter with respect to time. Such time step may be in the range of 5 seconds to 30 minutes, in particular in a range of 30 seconds to 5 minutes. A time derivative for the supplemental information may be obtained in a similar manner.

According to another aspect, the temporal change of at least one weather parameter, is characterized by a time derivative of the at least one weather parameter, namely either ambient temperature, relative humidity, wind speed, air pressure, or any other weather parameter. Accordingly, weather parameters are successively determined, in particular at least a first set of weather parameters at a first point in time and a second set of weather parameters at a second point in time. The result may also be that no temporal change took place.

It was realized that in addition to a weather point, namely the position of determined ambient temperature and determined relative humidity in a parameter space, the temporal change may be relevant for evaluating if icing is expected. Thus, how much the at least one weather parameter will change from the first set of weather parameters to the second set of weather parameters is considered.

For example there is no need for initiating heating, when the temporal change of the ambient temperature and/or relative humidity indicates that the weather point is leaving the icing area before significant ice formation is occurring.

Therefore, a time derivative of at least one weather parameter is considered. The time derivative indicates the direction of the weather parameter towards higher or lower values. The time derivative also indicates the speed with which the weather parameter is approaching higher or lower values. With respect to the icing criteria, in particular the icing area, the time derivative is used to evaluate if icing is expected.

In particular, to determine if icing is expected, the icing criteria depends on a temporal change of at least two, three, four or all weather parameters of the parameters considered for icing, in particular depending on the time derivative of at least two, three, four or all weather parameters of the parameters considered for icing. For example, if the time derivatives of all considered weather parameters are considered, a total time derivative can be obtained. Such total time derivative indicates the movement of a weather point with respect to all weather parameters of that weather point. Accordingly, it can be predicted how the weather situation will change according to all considered weather parameters within the entire parameter space.

Alternatively or additionally the temporal change of at least one weather parameter, is characterized by a parameter time vector. The parameter time vector is defined as the vector between the first set of weather parameters and the second set of weather parameters. The first set of weather parameters will be represented by a first weather point in the parameter space. After some time, the weather parameters might change. Thus, the second set of weather parameters is represented by a second weather point in the parameter space that has move with respect to the first weather point. The parameter time vector therefore defines the change from the first set of weather parameters to the second set of weather parameters, i.e., from the first weather point to the second. In other words, the parameter time vector is a vector pointing from the first weather point to the second weather point. According to the icing criteria, in particular the icing area, it is further evaluated if icing is expected depending on the parameter time vector.

According to another aspect, to determine if icing is expected, the icing criteria is evaluated also depending on an expected arrival time interval, representative of an expected time interval for a or the weather point to reach an icing border of the icing area.

The arrival time interval is representative of a time interval that is expected to pass before a weather point reaches an icing border of the icing area. Therein, the icing border is the edge of the icing area separating weather points that are expected to cause icing from weather points that are expected to cause no icing.

Depending on this expected arrival time, it is evaluated when the weather point, initially positioned outside the icing area, is expected to reach the icing area. In other words, it is evaluated not only that but when icing is expected. This allows for properly timing when heating should be initiated according to the icing area in combination with the arrival time interval. In other words, the initiation of heating can be timed accordingly.

It is further suggested that the expected arrival time interval is determined or calculated depending on the temporal change of at least one weather parameter. The temporal change shows the change with respect to time. Using this information, the time interval the weather point needs to reach the icing border is calculated. The expected arrival time interval may also be calculated considering at least two, three, four or all temporal changes and thus considering the temporal change for all considered weather parameters, in particular considering the time derivatives and thus the change of the ambient temperature and the relative humidity.

According to a further aspect, heating of the rotor blades is planned for a heating time interval. It was realized that heating for too long will consume a lot of energy making it ineffective and uneconomic. Therefore, heating is planned for a predefined heating time interval representative of the time during which the rotor blades are heated. The heating time interval is thus the time interval from the initiation of heating to the deactivation of heating.

For simplicity, the heating time interval can also be predefined to a specific time interval, for example to one hour. However in general, the heating time interval is defined depending on the weather parameters and, if applicable, the supplemental information. The heating time interval may also be defined depending on the temporal change of the weather parameters and, in particular depending on the arrival time interval. It was noticed that it is possible to determine for how long icing will be expected. This can be derived from the temporal change of the weather parameters. It can also be derived from the arrival time interval, calculated for a weather point, initially positioned inside the icing area.

Furthermore, a temporal change in the ambient temperature or other weather parameters might not only influence an expected icing, but also the approach in heating. Similar a temporal change in the wind speed might not only influence an expected icing, but it also influences the energy production and thus a balance between heating power and produced power.

In addition it was found that the length of such heating time interval might depend on the variation in time of the weather situation, in particular depending on a change of the ambient temperature. If the ambient temperature rises, that might make the heating time interval shorter. The heating time interval can also be adjusted, when the weather parameters or supplemental information change.

It is further suggested that if icing is expected, heating is initiated depending on an expected produced power expected to be produced by the at least one wind turbine during the heating time interval. In particular it is depending on the expected produced power in relation to an expected heating power expected to be consumed for heating of the rotor blades during the heating time interval.

In particular, if icing is expected, heating is initiated when the ratio of the expected produced power to the expected heating power exceeds a ratio of one, preferably exceeds a ratio of two.

It was found that it would be advantageous to check that heating does not consume more power than the wind turbine would be able to produce due to the heating and thus due to not having ice on the rotor blades. Accordingly the power expected to be produced and expected power for heating, i.e., the power needed for heating are compared. Heating is initiated depending on the result, such that rotor blades are heated or not. One effective way doing that is to build a ratio and such ratio should be larger than one. If it is one, the heating consumes all produced power and therefore the ratio should be larger than one. However, it was found that there might be other consumers as well when operating the wind turbine and thus more power might be needed to be produced than it is consumed by the heating and therefore a ratio above two is a good compromise to take that into account.

Considering the heating time interval also has the advantage to allow for momentarily higher power consumption than power production. If for example only at the beginning of the heating time interval more heating power is consumed than power is produced, heating might still make sense when this situation changes such that after a while less heating power is consumed and/or more power is produced.

In particular, the ratio of the expected produced power to the expected heating power is calculated for low wind speeds. It was found that at low wind speeds the expected produced power might be relatively low compared to the expected heating power. Thus for small wind speeds, the ratio is calculated and the heating is initiated depending on the ratio. For larger wind speeds, the expected produced power is considered high enough with respect to the expected heating power.

One possibility to consider the expected produced power to the expected heating power for the heating time interval is to compare the corresponding expected produced energy to the expected heating energy of this heating time interval.

According to another aspect the amount of heating power is controlled depending on the weather parameters and/or the temporal change of the weather parameters and/or the supplemental information and/or the expected arrival time interval.

For example a weather condition with a high temperature value requires less heating and therefore less heating power is needed than at a weather condition with low ambient temperature. Changes of weather conditions may also be taken into account in order to improve the control of the heating power. That way it can be anticipated if more or less heating power will be needed, depending on said changes, i.e., such changes can be predicted and depending on such prediction not only the detection of icing but also the amount of power needed for heating can be anticipated.

It was also found that the suggested preventive heating works best if it is controlled such that the rotor blades reach the right temperature at a point in time when icing was expected to begin if the rotor blades would not be heated. That goal can be achieved when the heating power is controlled depending on the temporal change of the weather parameter and/or the supplemental information and/or the expected arrival time interval.

Alternatively or additionally it is suggested that the amount of heating power is controlled depending on a target temperature, defining a temperature to be reached, in particular a temperature of the blade and/or at a blade surface. In particular a feedback control is used for controlling the heating power depending on a difference between the target temperature and an actual temperature.

Accordingly the amount of heating power is controlled in order to reach a predefined target temperature. The target temperature is the temperature the blades are supposed to be heated to. Thus, the target temperature is a temperature the blade and/or a blade surface is supposed to have reached after the heating is terminated. Setting this target temperature will automatically control the amount of heating power as it requires a specific amount of power. This amount of power thus depends on the target temperature, the actual temperature and the dynamic behavior of the control, in particular a gain of the control.

The target temperature is set depending on the weather parameters. For example, when the relative humidity is high and the air is nearly saturated, the target temperature might need to be set to a higher value compared to a lower relative humidity when the air is capable to still hold more water vapor.

According to another aspect, the icing criteria, and in particular the icing area, is determined depending on historical data, in particular depending on data of formerly detected icing events.

In particular, the historical data represents those weather parameters and supplemental information that were recorded when icing was detected earlier and/or at different sites.

Alternatively or in addition it is suggested that the icing criteria, and in particular the icing area, is regularly adjusted, i.e., adapted. This way said icing areas can be determined and adjusted during normal operation of the wind turbine. That makes the method simple to implement, without additional equipment, and provide for adequate results. The results can be improved that way during operation.

According to one aspect, the icing criteria, and in particular the icing area or icing border, is determined based on data collected by an icing detection method detecting icing events during operation of the wind turbine or a similar wind turbine. Based on that the icing detection method determines, depending on a weather situation, deviations of an actual operating point of the wind turbine resulting for the weather situation, to a reference operating point of the wind turbine, predetermined for the same weather situation. Based on that icing is detected if the determined deviation exceeds a predefined minimum deviation.

It is further suggested that if icing was detected, weather parameters of the same weather situation are recorded as weather parameters of icing, in particular as weather parameters for defining the icing criteria, in particular as weather parameters defining a weather point in the icing area in the parameter space. Optionally supplemental information of the same weather situation are recorded as associated supplemental information.

Accordingly, the wind turbine is operated regularly. All relevant weather parameters, including the wind speed, and supplemental information are constantly recorded. Depending on the weather parameters, and in particular depending on the wind speed the wind turbine takes a particular operating point. This may be based on a given characteristic curve, such as a rotor speed to power curve, or rotor speed to generator torque curve for a partial load operating mode. Based on such curve the wind turbine controller sets a power or torque value according to the curve.

Without icing on the rotor blades such control always leads for a particular wind speed to the same operating point, i.e., to the same power or torque value. In that case all the relevant weather parameters and supplemental information which are recorded are associated to a normal operation without icing, i.e., these weather parameters and supplemental information are associated to non-icing and thus also to a non-icing area.

However, if a too large deviation of the power or torque occurs, or of other parameters, and if the ambient temperature is low enough that icing can possibly occur, an icing is detected and the weather parameters and supplemental information are associated to icing, in particular to an icing area. Accordingly that way the icing criteria can be evaluated. In particular, an icing border, separating the non-icing area and the icing area, can be determined. Of course, for determining such icing criteria, icing area and/or icing border, a plurality of icing events need to be detected.

In particular a deviation of the actual operating point and the reference operating point is or comprises a deviation of actual produced power or actual generator torque and a predefined reference power or reference generator torque respectively, if the wind turbine is operating in a partial load operating mode. The relevance of using the power or generator torque was just explained above.

However a deviation of the actual operating point and the reference operating point is or comprises a deviation of an actual blade angle and a reference blade angle if the wind turbine is operated in a rated operating mode. In rated operating mode, also denumerated as full load mode, the wind turbine is operating at maximum and thus constant rotor speed, constant power and constant generator torque. Accordingly, these values cannot give a good indication of icing. Instead, the blade angle increases with increasing wind speed. Accordingly, there is a known relationship between the wind speed and the blade angle. If the blade angle deviates from this known relationship and the ambient temperature is low enough, icing may be detected.

According to one aspect, heating is initiated by a preheating time period in advance of an expected icing such that the rotor blades or parts of the rotor blades are heated up to a or the target temperature before the icing is expected to occur. Preferably the heating is initiated at least 20 min in advance of an expected icing event, i.e., the preheating time period is at minimum 20 minutes.

When icing is expected according to the icing criteria, such icing is expected in the near future, e.g., in an hour or half an hour as it also takes some time for building the ice at the rotor blades. That was realized and such point in time when a significant icing occurs can be calculated, at least estimated or predicted. Most easily such time duration can be taken from historical data, i.e., based on experience.

According to an aspect the preheating time by which the heating is initiated in advance of an expected icing, is adapted during operation, wherein the preheating time is decreased, in particular by a predetermined time step, each time heating is initiated, until energy losses due to icing exceed a predefined value.

Energy losses due to icing define a decrease in energy that can be fed into an electrical supply grid. Such decrease in energy may have two reasons. More energy might be needed for heating and/or less energy is produced due to decreasing aerodynamic efficiency.

To explain that, when the preheating time gets too short, a considerable amount of ice has already been formed. Consequently, deicing will become more difficult and more energy is needed for the deicing. It was also found that the energy need for deicing, i.e., for heating is also a good indicator for icing.

Additionally, the wind turbine will already be in a non-optimal situation producing less power. That should be avoided by heating early enough.

On the other hand, it is desired to not initiate the heating too early as this will waste a lot of energy. Therefore, energy loss is calculated as the difference between produced energy and expected energy for the current weather parameters under optimal situations. If the energy loss drops below a predefined value, the preheating time became too short and thus decreasing the preheating time is stopped. According to one aspect the preheating time is increase at least by the predetermined time step once the energy losses due to icing exceed a predefined value, i.e., once the preheating time became too short, it is increased again by one step.

This way the preheating time can be improved. An initial value for the preheating time can be taken from experiences. It is difficult to judge whether a preheating time is too long, as in that case everything works well. Accordingly it is suggested to decrease the preheating time until it is too short.

According to one aspect, for the icing criteria a higher sensitivity icing area is defined as a range of weather parameters, in particular as an area in the parameter space along the icing border. Accordingly there is a third area in the parameter space, which is basically close to the icing area.

The higher sensitivity area represents a range of weather parameters for which icing is not necessarily expected, but where icing is still probable.

According to the higher sensitivity area, icing is expected for a weather point inside the higher sensitivity icing area if an abnormal operation situation is identified. An abnormal operation situation can be identified if an operating point is exceeding a predefined deviation from a predefined reference value for longer than a predetermined minimum delay, in particular for longer than one minute and/or for a deviation of more than 2% or more than 5% of the reference value.

In particular an abnormal operation situation can be identified if a power is exceeding a pre-defined power curve and/or if a blade angle is exceeding a predefined blade angle curve, for longer than a predetermined minimum delay, in particular for longer than one minute.

The higher sensitivity icing area has the advantage that a smoother transition between the icing and non-icing area can be considered. The higher sensitivity icing area is thus an area, where the chance for icing to occur is still high. On the other hand, icing is not expected to occur in all possible situations. The consequence is that icing is expected only if also an abnormal operation situation is identified, wherein the abnormal operation situation is identified when the operation of the wind turbine behaves differently from what is expected under normal conditions, indicating a possible icing.

A feasible way to identify such an abnormal operation situation is for example via characteristic curves of the wind turbine, such as a power curve and/or a blade angle curve. If a distance from an operating point to the characteristic curve exceeds a predefined distance value and keeps this distance for a predefined amount of time, it can be expected that this behavior is due to the beginning of ice formation. At least that can be expected if the weather point is in the higher sensitivity area.

For weather points inside the non-icing area, it is usually expected that this behavior was caused by an error or was led to by other processes not related to icing.

However, if an abnormal operation situation is identified for weather points inside the higher sensitivity area, icing may be expected. To further improve the method, in particular to make it more reliable, it is suggested that icing is expected only if an abnormal operation situation is identified for a longer time period. This way it can be avoided that short exceptional situations lead to a misinterpretation.

Method according to another aspect, wherein in case the wind turbine was stopped, the wind turbine is started depending on the position of the weather point in the parameter space. It was noticed that the icing area can be used to decide whether it makes sense to start the wind turbine again. In particular, the wind turbine is started if the weather point is outside the icing area.

Method according to another aspect, wherein the method is regularly tested. This ensures that the heating performs as expected and reduces errors. Therefore, artificial weather points are constructed as well as artificial wind speeds. In particular different series of artificial weather points and artificial wind speeds.

The artificial weather points and wind speeds are introduced to the wind turbine to check whether the method performs as expected. This is in particular done during maintenance of the wind turbine.

According to the invention there is also proposed a wind power system, having at least one wind turbine, each wind turbine having an aerodynamic rotor with rotor blades, wherein the wind power system comprises a heating system for heating the rotor blades and the wind power system and/or each wind turbine comprise a control unit for controlling the heating of the rotor blades, and the wind power system, in particular the control unit, is adapted for executing a method for heating the rotor blades according to any of the preceding aspects.

The wind power system may be a wind turbine or a wind park. The wind power system is adapted for executing a method for heating the rotor blades and that can be done by implementing a corresponding method or computer program on the control unit.

BRIEF DESCRIPTION OF THE SEVERAL VIEWS OF THE DRAWINGS

The present invention is explained by way of example in more detail below with reference to the accompanying figures, wherein the same reference signs are used for the same or similar elements.

DETAILED DESCRIPTION

Figure 1:
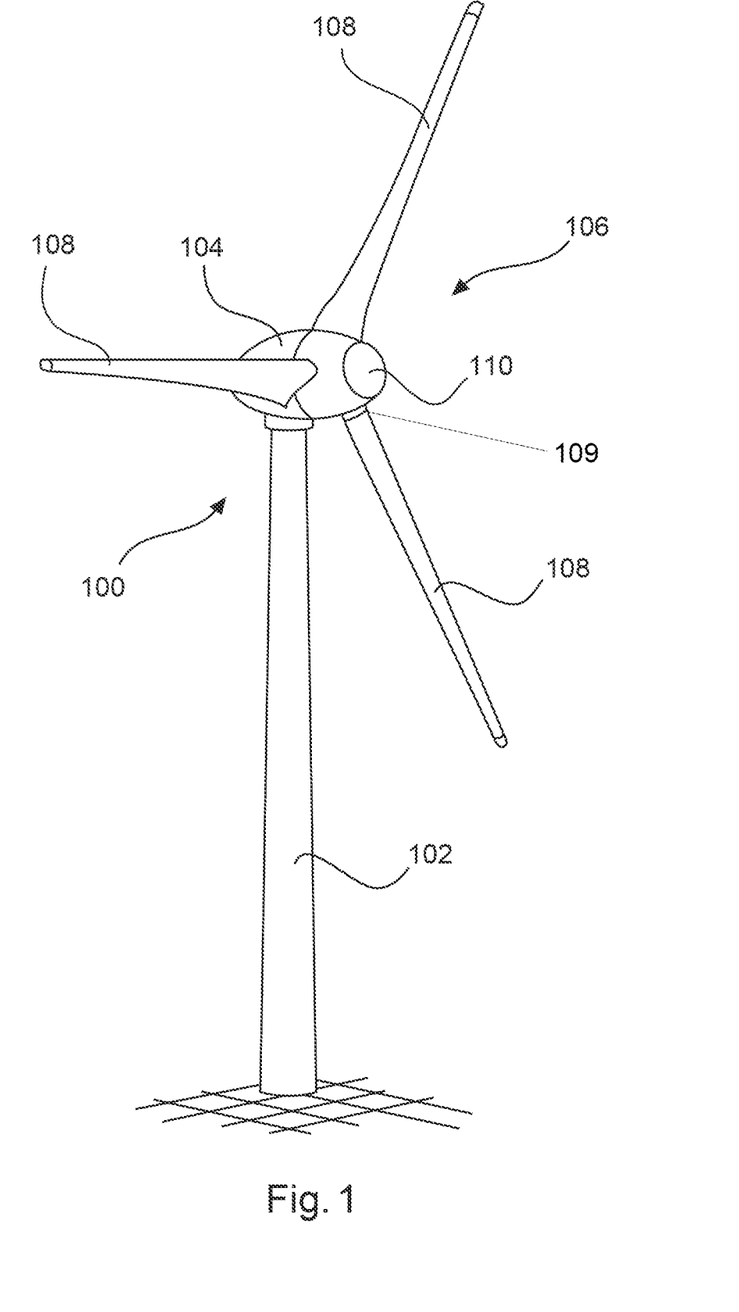
FIG. 1 shows a wind turbine in a perspective view.

FIG. 1 shows a wind turbine according to the invention. The wind turbine 100 has a tower 102 and a nacelle 104. Disposed on the nacelle 104 there is a rotor 106, which has three rotor blades 108 and a spinner 110. When in operation, the rotor 106 is put into a rotary motion by the wind, and thereby drives an electric generator in the nacelle 104.

Figure 2:
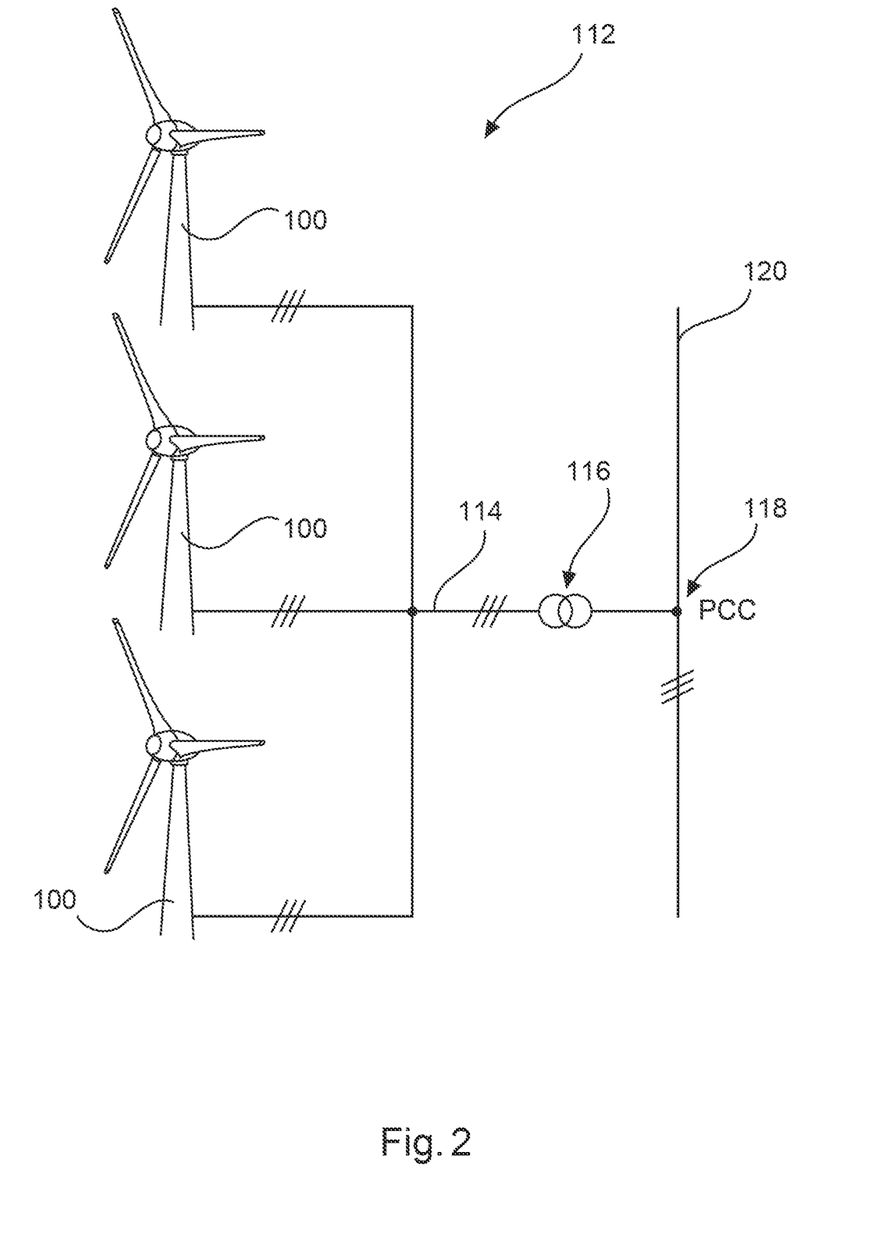
FIG. 2 shows a wind farm in a structural view.

FIG. 2 shows a wind farm 112 having, just as an example, three wind turbines 100, which may be similar or different. Thus, said three wind turbines 100 may represent basically any number of wind turbines of a wind farm 112. The wind turbines 100 provides their power, in particular the generated current using an electrical farm network 114. Thereby the generated currents or generated power of each wind turbine 100 respectively will be summed up. Often there is a transformer 116 transforming the voltage in the farm to a higher level, in order to feed in the overall current or overall power respectively at the feed in point 118 into the electrical supply grid 120. The feed in point 118 may also be depicted as point of common coupling (PCC).

Figure 3:
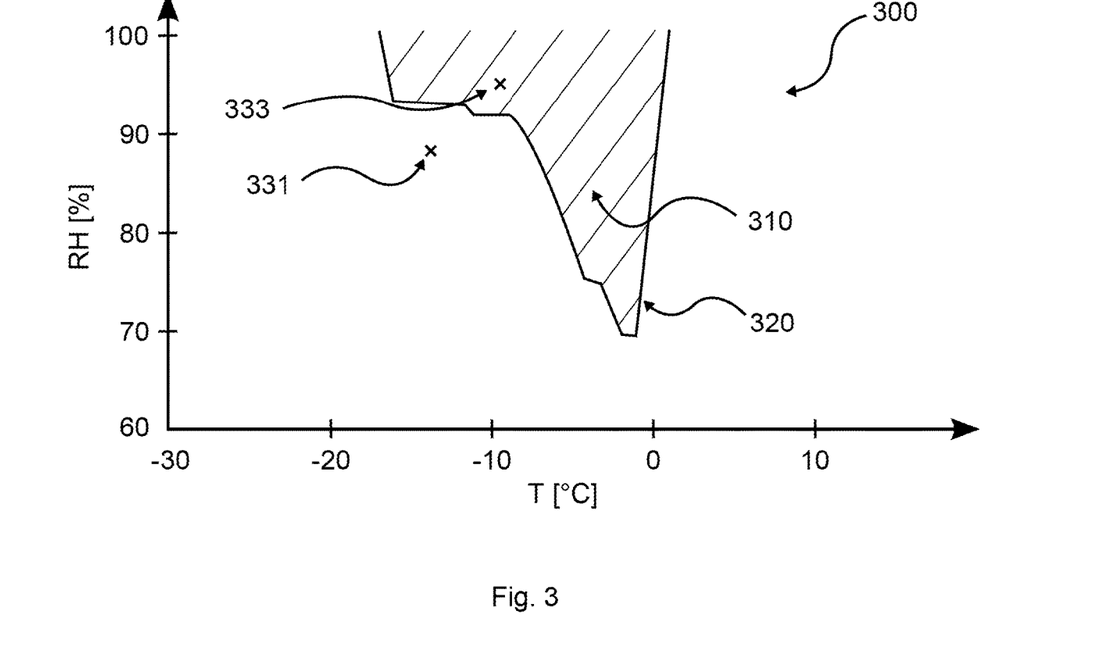
FIG. 3 shows an icing area according to the invention.

FIG. 3 shows a parameter space 300 in a coordinate system with the weather parameters ambient temperature T in degree Celsius (° C.) on the abscissa and relative humidity RH in percent (%) on the ordinate. The ambient temperature T covers a range of −30° C. to 10° C., whereas the relative humidity is shown for a range of 60% to 100%.

Accordingly the ambient temperature T and relative humidity RH span the parameter space 300.

Within the parameter space 300 there is an icing area 310, in which icing is expected to occur on the rotor blades 108 of the wind turbine 100, i.e., if a weather point representing a pair of weather parameters is in the icing area, icing is expected. An icing border 320 separates the icing area 310 from the rest of the available parameter space 300. The icing area is defined for a particular wind speed or wind speed range that is not further specified for this example.

As an example, a first set of weather parameters, namely an ambient temperature of roughly −13° C. and a relative humidity of roughly 87% define a first weather point 331 for a time $t_0$, located outside the icing area 310.

A second weather point 333 is shown for a later time $t_2$. The second weather point 333 is lying inside the icing area 310 and is defined by an ambient temperature of roughly −10° C. and a relative humidity of roughly 95%.

As time changes from $t_0$ to $t_2$ the weather parameters change accordingly from the first weather point 331 to the second weather point 333, crossing the icing border 320 at time $t_1$. The time steps are ordered as $t_0 < t_1 < t_2$.

When the weather point crosses the icing border at time $t_1$ icing is expected and heating of rotor blades 108 of the wind turbine 100 is initiated. However, that might not be immediately but by a preheating time period in advance of an expected icing. To give an example, at time $t_1$ icing is expected to occur in half an hour time after $t_1$ and there is a preheating time determined of 20 minutes. Accordingly heating starts 10 minutes after $t_1$.

Figure 4:
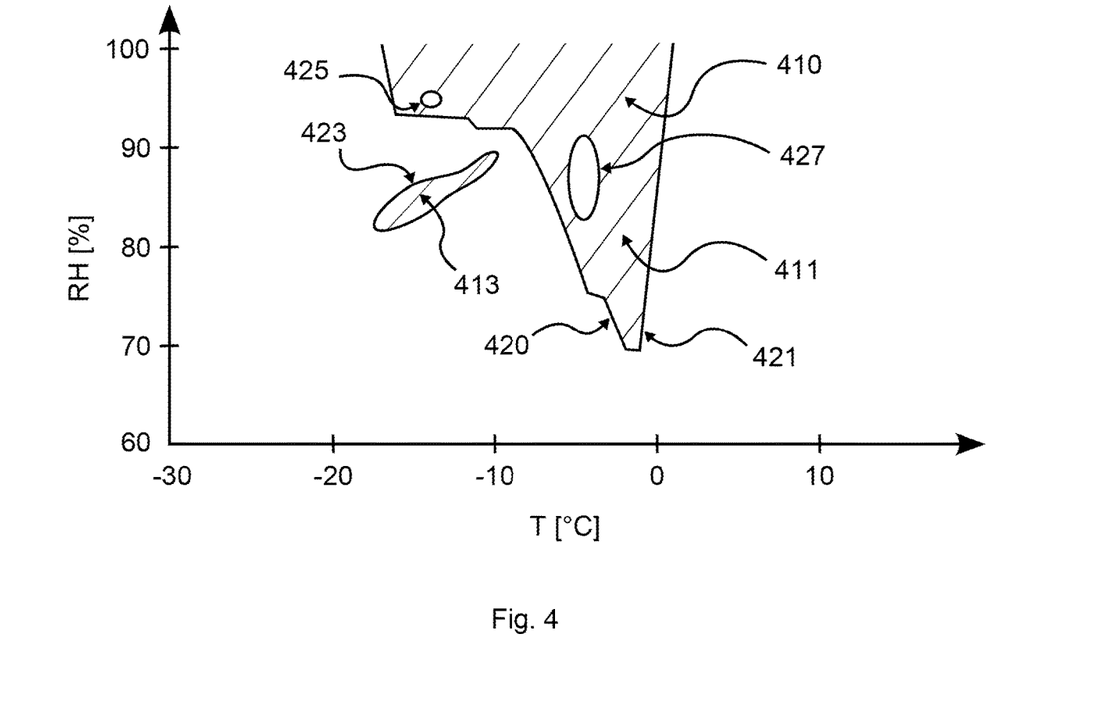
FIG. 4 shows an adapted icing area according to the invention.

FIG. 4 shows the same parameter space and coordinate system as described in FIG. 3 but with different icing area 410. Depending on the wind speed and/or other supplemental information the icing area 410 is adapted. In particular the icing area 310 of FIG. 3 and the icing area 410 of FIG. 4 may be defined for different wind speed ranges. This icing area 410 covers two unconnected regions, a first icing area patch 411 and a second icing area patch 413.

Accordingly, an icing border 420 is also different to the icing border 320 of FIG. 3. The icing border 420 now comprises a first icing border part 421 surrounding the first icing area patch 411 and a second icing border part 423 surrounding the second icing area patch 413. In the first icing area patch 411 there are also two small regions cut out of the first icing area patch 411, therefore creating a third icing border part 425 and a fourth icing border part 427. The third icing border part 425 and a fourth icing border part 427 are thus located within the icing area 411. It was found that such small areas may exist in which, i.e., for the corresponding associated weather point, icing is not expected even though for similar weather points icing is expected. It is suggested to also identify such small areas.

Figure 5:
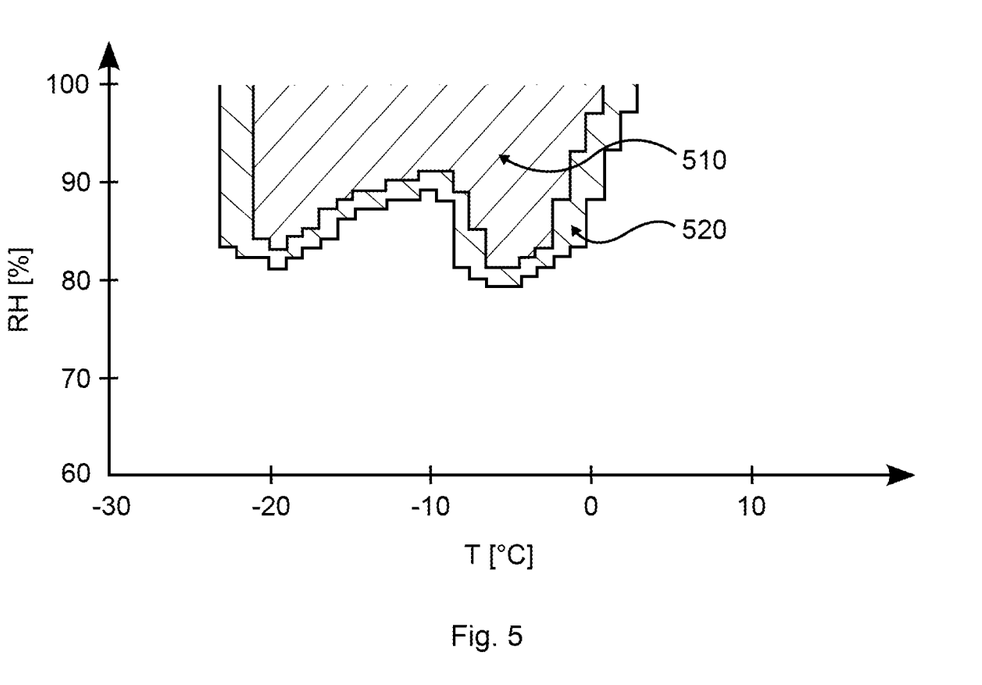
FIG. 5 shows a higher sensitivity icing area.

FIG. 5 shows the same parameter space and coordinate system as described in FIGS. 3 and 4. However, FIG. 5 shows an icing area 510 for a wind turbine 100' at a different location.

Within a predefined proximity of the icing area 510 a higher sensitivity icing area 520 is defined.

A weather point lying inside the icing area 510 will lead to initiating of heating. However, also a weather point lying inside the higher sensitivity icing area 520 could lead to initiating of heating if further requirements are met.

For instance, if the temporal change of a weather parameter indicates a direction towards the icing area 510, the heating is initiated. With decreasing distance of the weather point to the icing area 510, less temporal change of the weather parameter is needed to result in initiation of heating.

Another scenario is when a weather point is inside the higher sensitivity icing area 520 and an operating point of the wind turbine is exceeding a predefined deviation from a predefined reference value for a predefined period of time, in particular for one minute. In particular, if the difference between power and a predefined power curve exceeds a critical value, heating is initiated for weather points inside the higher sensitivity icing area 520. In the same way, heating is initiated when the blade angle of the rotor blades 108 exceeds a critical value.

Embodiment 1

According to an alternative aspect there is also proposed a method according to the following embodiments:

Embodiment 1.1. Method for controlling heating of rotor blades of an aerodynamic rotor of a wind turbine, wherein
the heating of the rotor blades is initiated, if icing of the rotor blades is expected, wherein,
according to an icing criteria, if icing is expected is evaluated depending on
a determined ambient temperature,
a determined relative humidity, and
a determined wind speed,
each defining a determined weather parameter, wherein
wind speed ranges are predefined, and
according to the icing criteria, if icing is expected is evaluated depending on the determined wind speed with respect to the predefined wind speed ranges.

Embodiment 1.2. Method according to embodiment 1.1 wherein
for the icing criteria an icing area, defining an area in which icing is expected, is determined with respect to a parameter space spanned by at least
the ambient temperature and
the relative humidity,
the icing area is determined depending on the wind speed ranges, and
if icing of the rotor blades is expected is evaluated depending on determining if the determined ambient temperature and the determined relative humidity define a weather point inside the icing area.

Embodiment 1.3. Method according to any of the preceding embodiments, wherein
further according to the icing criteria, if icing is expected is evaluated depending on a temporal change of at least one of the weather parameters or of at least one other weather parameter, wherein
the temporal change of at least one weather parameter, is characterized by
a time derivative of the at least one weather parameter and/or
by a parameter time vector defining a change from
a first set of weather parameters at a first weather point in the parameter space at a first point in time to
a second set of weather parameters at a second weather point in the parameter space at a second point in time.

17

Embodiment 1.4. Method according to any of the preceding embodiments, in combination with at least one feature of the claims 4-6, 8-15.

Embodiment 1.5. Wind power system, having at least one wind turbine, each wind turbine having an aerodynamic rotor with rotor blades, wherein
- the wind power system comprises a heating system for heating the rotor blades and
- the wind power system and/or each wind turbine comprise a control unit for controlling the heating of the rotor blades, and
- the wind power system, in particular the control unit, is adapted for executing a method for heating the rotor blades according to any of the embodiments 1.1 to 1.4.

Embodiment 2

According to an alternative aspect of the invention there is also proposed a method according to another embodiment 2.1.

Embodiment 2.1. Method for controlling heating of rotor blades of an aerodynamic rotor of a wind turbine, wherein
- the heating of the rotor blades is initiated, if icing of the rotor blades is expected, wherein,
- according to an icing criteria, if icing is expected is evaluated depending on
- a determined ambient temperature,
- a determined relative humidity, and
- a determined wind speed,
- each defining a determined weather parameter, wherein
- the icing criteria is determined depending on historical data, in particular depending on data of formerly detected icing events, and/or
- the icing criteria, is regularly adjusted.

Embodiment 2.2. Method according to embodiment 2.1 wherein
- for the icing criteria an icing area, defining an area in which icing is expected, is determined with respect to a parameter space spanned by at least
- the ambient temperature and
- the relative humidity,
- the icing area is determined depending on the wind speed ranges, and
- if icing of the rotor blades is expected is evaluated depending on determining if the determined ambient temperature and the determined relative humidity define a weather point inside the icing area.

Embodiment 2.3. Method according to any of the preceding embodiments, wherein
- further according to the icing criteria, if icing is expected is evaluated depending on a temporal change of at least one of the weather parameters or of at least one other weather parameter, wherein
- the temporal change of at least one weather parameter, is characterized by
- a time derivative of the at least one weather parameter and/or
- by a parameter time vector defining a change from
- a first set of weather parameters at a first weather point in the parameter space at a first point in time to
- a second set of weather parameters at a second weather point in the parameter space at a second point in time.

Embodiment 2.4. Method according to any of the preceding embodiments, in combination with at least one feature of the claims 3-6, 8-10, 12-15.

18

Embodiment 2.5. Wind power system, having at least one wind turbine, each wind turbine having an aerodynamic rotor with rotor blades, wherein
- the wind power system comprises a heating system for heating the rotor blades and
- the wind power system and/or each wind turbine comprise a control unit for controlling the heating of the rotor blades, and
- the wind power system, in particular the control unit, is adapted for executing a method for heating the rotor blades according to any of the embodiments 2.1 to 2.4.

Embodiment 3

According to an alternative aspect of the invention there is also proposed a method according to another embodiment 3.1.

Embodiment 3.1. Method for controlling heating of rotor blades of an aerodynamic rotor of a wind turbine, wherein
- the heating of the rotor blades is initiated, if icing of the rotor blades is expected, wherein,
- according to an icing criteria, if icing is expected is evaluated depending on
- a determined ambient temperature,
- a determined relative humidity, and
- a determined wind speed,
- each defining a determined weather parameter, and
- further according to the icing criteria, if icing is expected is evaluated depending on an abnormal operation situation, wherein
- an abnormal operation situation can be identified if an operating point is exceeding a predefined deviation from a predefined reference value for longer than a predetermined minimum delay, in particular for longer than one minute,
- in particular an abnormal operation situation can be identified if a power is exceeding a predefined power curve and/or if a blade angle is exceeding a predefined blade angle curve, for longer than a predetermined minimum delay, in particular for longer than one minute.

Embodiment 3.2. Method according to embodiment 3.1, wherein
- for the icing criteria an icing area, defining an area in which icing is expected, is determined with respect to a parameter space spanned at least by
- the ambient temperature and
- the relative humidity,
- the icing area is determined depending on a wind speed, and
- icing of the rotor blades is expected is evaluated depending on determining if the determined ambient temperature and the determined relative humidity define a weather point inside the icing area.

Embodiment 3.3. Method according to any of the preceding embodiments, wherein
- for the icing criteria a higher sensitivity icing area is defined as an area in a or the parameter space along a or the icing border, and
- icing is expected for a or the weather point inside the higher sensitivity icing area if an abnormal operation situation is identified.

Embodiment 3.4. Method according to any of the preceding embodiments, wherein
- further according to the icing criteria, if icing is expected is evaluated depending on a temporal change of at least one of the weather parameters or of at least one other weather parameter, wherein the temporal change of at least one weather parameter, is characterized by a time derivative of the at least one weather parameter and/or by a parameter time vector defining a change from a first set of weather parameters at a first weather point in the parameter space at a first point in time to a second set of weather parameters at a second weather point in the parameter space at a second point in time.

Embodiment 3.5. Method according to any of the preceding embodiments, in combination with at least one feature of the claims 3-6, 8-15.

Embodiment 3.6. Wind power system, having at least one wind turbine, each wind turbine having an aerodynamic rotor with rotor blades, wherein the wind power system comprises a heating system for heating the rotor blades and the wind power system and/or each wind turbine comprise a control unit for controlling the heating of the rotor blades, and the wind power system, in particular the control unit, is adapted for executing a method for heating the rotor blades according to any of the embodiments 3.1 to 3.5.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling heating of rotor blades of an aerodynamic rotor of a wind turbine, the method comprising:
    evaluating if icing of the rotor blades is expected, wherein
       evaluating if icing of the rotor blades is expected is based on an icing criteria that includes a determined ambient temperature, a determined relative humidity, and a determined wind speed, and
    initiating heating the rotor blades if icing of the rotor blades is expected,
    wherein each of the determined ambient temperature, the determined relative humidity, and the determined wind speed define a weather parameter, and
    wherein according to the icing criteria, icing is expected depending on a temporal change of at least one of the weather parameters
    wherein evaluating if icing of the rotor blades is expected includes, for an icing area, defining an area in which icing is expected, wherein the area is determined with respect to a parameter space spanned at least by:
       the determined ambient temperature, and
       the determined relative humidity,
    wherein the icing area is determined further depending on the wind speed, and
    wherein evaluating if icing of the rotor blades is expected depends on determining whether the determined ambient temperature and the determined relative humidity define a weather point inside the icing area.

2. The method according to claim 1, wherein:
    wind speed ranges are predefined,
    evaluating if icing of the rotor blades is expected further depends on the determined wind speed with respect to predefined wind speed ranges, and
    the icing area is further determined depending on the wind speed ranges.

3. The method according to claim 1, wherein the temporal change of the at least one weather parameter is a temporal change of at least one of:
    the determined ambient temperature,
    the determined relative humidity,
    the determined wind speed, and
    an air pressure.

4. The method according to claim 1, wherein, evaluating if icing is expected further depends on at least one supplemental information, and/or
    wherein the icing area is further determined depending on the at least one supplemental information,
    wherein the at least one supplemental information is chosen from a list comprising:
       a blade temperature representative of a surface temperature of a surface of at least one of the rotor blades,
       an air pressure,
       a blade load representative of a load acting on at least one of the rotor blades,
       a dew point of ambient air,
       a rotational speed, and
       a tip-speed ratio.

5. The method according to claim 1, wherein, at least one of the weather parameters contain actual, estimated and/or predicted values, wherein:
    at least one actual value is determined using a sensor,
    at least one estimated value is estimated from an operating parameter of an operating point of the wind turbine,
    at least one predicted value is predicted using a weather forecast, and/or
    at least one predicted value is predicted using a time derivative of values of a corresponding weather parameter.

6. The method according to claim 1, wherein the temporal change of at least one weather parameter is defined by:
    a time derivative of the at least one weather parameter; and/or
    a parameter time vector defining a change from:
       a first set of weather parameters at a first weather point in a parameter space at a first point in time, to
       a second set of weather parameters at a second weather point in a parameter space at a second point in time.

7. The method according to claim 1, wherein evaluating if icing of the rotor blades is expected is further based on:
    an expected arrival time interval, representative of an expected time interval for a weather point to reach an icing border of the icing area,
    wherein the expected arrival time interval is calculated depending on the temporal change of at least one weather parameter.

8. The method according to claim 1, wherein:
    the icing area is further determined depending on historical data of formerly detected icing events, and/or
    the icing criteria is regularly adjusted.

9. The method according to claim 1, wherein:
    the icing criteria, the icing area, or icing border is further determined based on data collected by an icing detection method detecting icing events during operation of the wind turbine or a similar wind turbine, the icing detection method determines, depending on a weather situation, deviations of:
- an actual operating point of the wind turbine resulting for the weather situation, and
- a reference operating point of the wind turbine predetermined for a same weather situation, wherein icing is detected if the determined deviation exceeds a predefined minimum deviation, and if icing is detected, the method further comprising:
- recording the weather parameters of the same weather situation as weather parameters of icing, and
- recording supplemental information of the same weather situation as associated supplemental information, wherein a deviation of the actual operating point and the reference operating point comprises:
- a deviation of actual produced power or actual generator torque and a predefined reference power or reference generator torque, respectively, if the wind turbine is operating in a partial load operating mode, or
- a deviation of an actual blade angle and a reference blade angle if the wind turbine is operated in a rated operating mode.

10. The method according to claim 1, wherein the heating is initiated by a preheating time period in advance of an expected icing such that at least portions of the rotor blades are heated up to a target temperature before the icing is expected to occur.

11. A method for controlling heating of rotor blades of an aerodynamic rotor of a wind turbine, the method comprising:
- evaluating if icing of the rotor blades is expected, wherein evaluating if icing of the rotor blades is expected is based on an icing criteria that includes a determined ambient temperature, a determined relative humidity, and a determined wind speed, and
- initiating heating the rotor blades if icing of the rotor blades is expected,
- wherein each of the determined ambient temperature, the determined relative humidity, and the determined wind speed define a weather parameter,
- wherein according to the icing criteria, icing is expected depending on a temporal change of at least one of the weather parameters,
- wherein the heating is initiated by a preheating time period in advance of an expected icing such that at least portions of the rotor blades are heated up to a target temperature before the icing is expected to occur,
- wherein the preheating time by which the heating is initiated in advance of the expected icing, is adapted during operation, and
- wherein the preheating time is decreased by a predetermined time step, each time heating is initiated, until energy losses due to icing exceed a predefined value.

12. The method according to claim 1, wherein:
for the icing criteria, a higher sensitivity icing area is defined as a range of weather parameters including an area in a parameter space along an icing border, and icing is expected for a weather point inside the higher sensitivity icing area if an abnormal operation situation is identified,
the abnormal operation situation is identified if an operating point exceeds a predefined deviation from a predefined reference value for longer than a predetermined minimum delay, and
the abnormal operation situation is identified if a power exceeds a predefined power curve and/or if a blade angle exceeds a predefined blade angle curve for longer than a predetermined minimum delay.

13. A method for controlling heating of rotor blades of an aerodynamic rotor of a wind turbine, the method comprising:
- evaluating if icing of the rotor blades is expected, wherein evaluating if icing of the rotor blades is expected is based on an icing criteria that includes a determined ambient temperature, a determined relative humidity, and a determined wind speed, and
- initiating heating the rotor blades if icing of the rotor blades is expected,
- wherein each of the determined ambient temperature, the determined relative humidity, and the determined wind speed define a weather parameter,
- wherein according to the icing criteria, icing is expected depending on a temporal change of at least one of the weather parameters,
- wherein initiating heating the rotor blades occurs in a heating time interval, and
- wherein if icing is expected, heating is initiated depending on an expected produced power expected to be produced by the turbine during the heating time interval.

14. The method according to claim 13, wherein heating is initiated when a ratio of the expected produced power to the expected heating power exceeds one.

15. The method according to claim 14, wherein the ratio exceeds two.

16. The method according to claim 13, wherein the heating time interval is amended depending on a predicted variation in time of the ambient temperature.

17. The method according to claim 13 comprising controlling an amount of heating power depending on at least one variable chosen from the weather parameters, the temporal change of the weather parameters, supplemental information, and an expected arrival time interval, and/or
wherein the amount of heating power is controlled depending on a target temperature of a surface of at least one of the rotor blades.

18. A wind power system, comprising:
at least one wind turbine, each of the at least one wind turbine having an aerodynamic rotor with a plurality of rotor blades,
a heating system for heating the plurality of rotor blades, and
a controller configured to execute the method according to claim 1 to heat the plurality of rotor blades.

* * * * *